(12) United States Patent
Tooker et al.

(10) Patent No.: US 6,775,288 B1
(45) Date of Patent: Aug. 10, 2004

(54) IDENTIFYING SOFT PERMANENT VIRTUAL CIRCUITS

(75) Inventors: Mark Tooker, Kanata (CA); Robert Muller, Ottawa (CA); Ron Veeneman, Carleton Place (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/041,683

(22) Filed: Mar. 13, 1998

(51) Int. Cl.[7] .............................................. H04L 12/28
(52) U.S. Cl. ................................. 370/395.2; 370/397
(58) Field of Search .......................... 370/248, 247, 370/250, 252, 395.1, 396, 397, 395.2, 395.3, 395.31, 410, 409; 709/223, 224

(56) References Cited

U.S. PATENT DOCUMENTS

| | | | | |
|---|---|---|---|---|
| 5,894,471 A | * | 4/1999 | Miyagi et al. | 370/230 |
| 5,930,238 A | * | 7/1999 | Nguyen | 370/486 |
| 6,115,382 A | * | 9/2000 | Abe | 370/395.3 |
| 6,128,302 A | * | 10/2000 | Kim et al. | 370/397 |
| 6,147,965 A | * | 11/2000 | Burns et al. | 370/216 |

OTHER PUBLICATIONS

The ATM Forum, Soft PVC MIB, pp. 1–18, Sep. 1996.*

* cited by examiner

*Primary Examiner*—Frank Duong
(74) *Attorney, Agent, or Firm*—Marks & Clerk

(57) ABSTRACT

A method and system for identifying switched virtual channel (SVC) connections and soft permanent virtual circuits (SPVCs) which traverse randomly selected switches in a digital communications network are described. The network includes a network management system (NMS) for provisioning the soft permanent virtual circuits across the network from endpoint to endpoint. Two embodiments are described. In the first, information respecting the cross connect route of the SPVC is provided to and retained by the NMS for subsequent retrieval. In the second, the NMS assigns an identifier or tag to the SPVC at the time the request to establish the circuit is issued. This tag is propagated through the network core switches as the SPVC is established and forms part of the information package stored at each switch. The SPVC tag is supplied to the NMS in response to an inquiry as to identity of the SPVC crossing any randomly selected core switch.

12 Claims, 1 Drawing Sheet

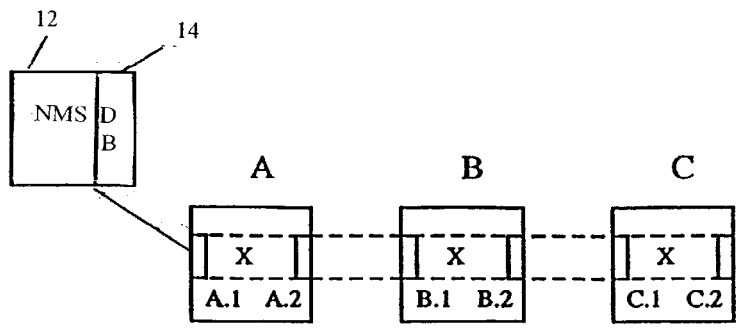
FIGURE 1
```
SPVCs
ID   Endpoint 1   Midpoints          Endpoint 2   Other Info
...
8.   A.1          A.2, B.1, B.2, C.1  C.2         ....
...
```
FIGURE 2
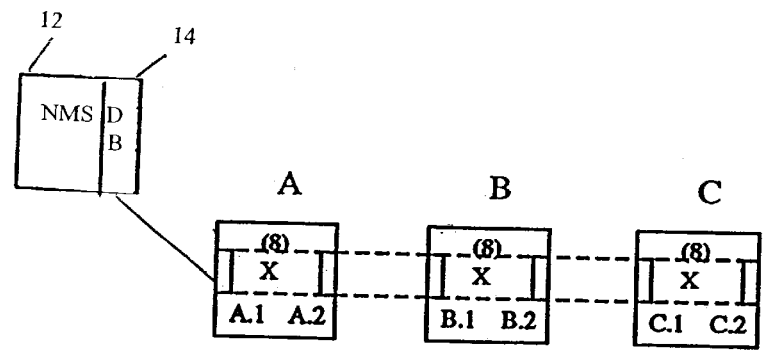
FIGURE 3A
```
SPVCs
ID   Endpoint 1   Endpoint 2   Other Info
...
8.   A.1          C.2          ....
...
```
FIGURE 3B

IDENTIFYING SOFT PERMANENT VIRTUAL CIRCUITS

FIELD OF THE INVENTION

This invention relates to digital communication networks having a network management system (NMS) for managing data traffic between user endpoints through intermediate core switches in the network and more particularly to the establishment of soft permanent virtual circuits (SPVC) across the network provisioned with means to identify any SPVC crossing a randomly selected core switch.

BACKGROUND

Digital communications networks, such as frame relay (FR) and asynchronous transfer mode (ATM), conventionally employ virtual circuits for the routing of data traffic across the integrated switching fabric of the network. When a virtual circuit is provisioned externally to provide a user with a quasi-dedicated route through the network it is known as a permanent virtual circuit (PVC). In digital networks a soft permanent virtual circuit is a communications medium which is permanently provisioned at the endpoints, but switched in the middle. The provisioning is controlled by the Communications Network Management Systems (NMSs) which also allow the creation, configuration, and display of the soft permanent virtual circuits (SPVCs) across the network. SPVCs traverse one or more core switches in order to allow two or more system end users to communicate. When an NMS establishes a SPVC, it requests a single switch at one of the desired endpoints of the SPVC to perform the necessary cross connections to reach the other endpoint of the SPVC. The endpoint switch uses routing software to establish the route for the SPVC, sets up a single cross connection on itself, then uses signaling software to request other switches to establish the rest of the cross connections. The signaling software sends only the minimum amount of information necessary to establish and maintain the cross connections such as; calling address, called address, bandwidth, traffic management characteristics, etc. The other switches signal back to the endpoint switch when they have completed the cross connections, and the endpoint switch then reports to the NMS that the SPVC has been established.

In a network in which many SPVCs exist, a user of the NMS can commonly select any switch in the network, and discover whether SPVC cross connections exist on that switch. Having discovered the existence of a cross connection, the user of the NMS should then be able to determine to which SPVC the cross connection belongs.

Identifying SPVCs in this way is useful, for example, for gauging the efficiency of the SPVC routing software, or for determining which edge switches, edge interfaces or SPVC end users are utilizing particular resources in the core of the network.

One solution to the problem of identifying SPVCs from randomly-selected cross connections in the middle of the network is not entirely satisfactory. It is possible for the NMS to identify the parent SPVC from a randomly selected point in the network without collecting and storing information on every SPVC cross connection in the network, but only storing information on the two endpoints of each cross connection, by a process of following cross connections and links forward or backward from the selected point, thus "walking" through the network until a known SPVC endpoint is reached. Each node within the network that is traversed by the SPVC connection must be queried by the NMS in order to trace the entire path of that connection.

Applying this solution to the example presented in FIG. 1, if the user selects the point B.2, the NMS first queries switch B and finds out that it is cross connected to point B.1. If it is known that point B.1 is physically or logically connected to point A.2, then the NMS can query switch A to determine what A.2 is cross connected to. When it learns that A.2 is cross connected to A.1, it compares A.1 to its list of SPVC endpoints and thus determines the identity of the SPVC (8 in this example) that crosses point B.2.

The shortcoming of this approach is that it is costly in terms of (a) the user's time, (b) NMS processing resources, (c) NMS-to-switch bandwidth resources, and (d) switch processing resources. The larger the network (and therefore the more cross connections that are required for an SPVC to cross the network), the higher the cost of using this algorithm.

Accordingly, a solution which makes more efficient use of the systems resources, is required.

SUMMARY OF THE INVENTION

Therefore, in accordance with a first aspect of the present invention there is provided in a digital communications network for routing data between endpoint switches through a plurality of core switches, the network having a network management system (NMS). for provisioning a selected one of the endpoint switches to establish a switched virtual connection in the form of a switched virtual channel (SVC) or a soft permanent virtual circuit (SPVC) through the network, the SPVC or SVC being created by the core switches configuring cross connections therebetween, a method of identifying the SPVC at a selected core switch comprising: providing a database in said NMS for storing routing information; providing means at each of said core switches for collecting routing information; providing means in said NMS to collect said routing information from said core switches; and providing means in said NMS for identifying route information respecting said selected core switch.

In accordance with a second aspect of the invention there is provided in a digital communications network for routing data between endpoint switches through a plurality of core switches, said network having a network management system (NMS) for provisioning a selected one of said endpoint switches to establish a switched virtual connection in the form of a switched virtual channel (SVC) or a soft permanent virtual circuit (SPVC) through said network, said SVC or SPVC being created by said core switches configuring cross connections therebetween, a method of identifying said SPVC at a selected core switch comprising: providing an identifying tag to said SVC or SPVC upon initial establishment thereof; providing storage means in each of said core switches for storing relevant information; transporting said identifying tag through said core switches together with the cross connection configuration instructions and retaining said identifying tag in each of the storage means crossed; providing means in said NMS for accessing said storage means; and accessing said storage means in a selected core switch in response to a request to identify said SPVC or SVC thereat.

BRIEF DESCRIPTION OF THE DRAWINGS

The invention will now be described in greater detail with reference to the attached drawings wherein:

FIG. 1 is a high-level block diagram of a SPVC crossing a network of three switches;

FIG. 2 illustrates SPVC crossing information maintained by the NMS in accordance with a first embodiment of the invention;

FIG. 3A is a high-level block diagram of a specific SPVC crossing a network of three switches; and FIG. 3B illustrates tagged cross connection identification according to a second embodiment of the invention.

DETAILED DESCRIPTION OF THE INVENTION

Two improved methods of identifying a SPVC at a randomly selected core switch are provided. The first, especially suited for smaller networks such as local area networks (LANs), provides improved information-retrieval times. The second is better suited for wider area systems.

In the first embodiment of the invention the network management system (NMS) 12 maintains a copy of the cross connection information for all SPVCs. In this approach, as soon as a SPVC becomes established (i.e. the various switches in the network complete all cross connections required to make up the SPVC), the switches report the details of each cross connection to the NMS. The NMS stores a copy of the information in a database 14 which may be, for example on a hard disk. Alternatively, the NMS can query the switches after the establishment of an SPVC in order to determine exactly where the SPVC was routed, and store the information in a database. When the user of the NMS chooses a point anywhere in the network and requests to see information about the SPVC which is crossing that point, the NMS software can quickly retrieve the information from its database and present it to the user.

FIG. 1 shows a SPVC which crosses four intermediate points before reaching its destination. As each switch, A, B and C, completes its cross connection configuration the cross connect information is stored in memory (not shown) on the switch. This information is then passed down to the NMS automatically upon completion of the SPVC or upon a specific request from the NMS.

FIG. 2 is a copy of the SPVC cross connection information which would be maintained in the database of the NMS. Since the cross connection information is readily available, this embodiment of the invention provides for a very fast presentation of connection information to the NMS user. Thus, the shortcoming previously noted as a) in the prior art is overcome.

However, a potential limitation of this approach is that because of the large number of SPVCs which can exist in large-scale networks, it may be impractical for the NMS to maintain a copy of all of the connection information for every SPVC. It is costly to provide sufficient communications bandwidth between the switches and the NMS, especially in a Wide Area Network (WAN) where many of the switches may be located far from the NMS. Additionally, it is costly to provide storage capacity on the NMS for large amounts of cross connection information. Furthermore, the processing time used by switches to gather and report information on every SPVC cross connection may hinder the ability of the switches to maintain the viability of the cross connections themselves.

The second embodiment of the invention introduces a tagged SPVC cross connection concept. According to this embodiment when the NMS requests a switch to established a SPVC, the NMS includes a "tag" with the request that uniquely identifies the SPVC, among all of the other SPVCs being managed by the NMS. The switch then propagates the tag along with the other information that is signaled through the network, so that each switch which is requested to set up a cross connection forming a part of the SPVC will store the tag in association with the cross connection. Whenever the NMS requests information on a randomly-selected point in the network, the switch returns to the NMS all of the information on the cross connection using that point, plus the tag. The NMS can then use the tag returned by the switch to look up and display information on the SPVC to which the cross connection belongs.

FIG. 3A shows an SPVC where each cross connection is tagged with the NMS's SPVC identifier number. The tag may consist of an identifier which can be used to look up one or more records directly from the NMS database 14, or else it can be some other format, which can be translated by the NMS 12 into a database record identifier by means of a translation table, or some other algorithmic process.

The format and contents of the tag may be entirely opaque to the managed elements or core switches themselves, or the tag may consist of data using a specific format and contents that are agreed upon between the designers of the NMS and the switches, which can then be interpreted and used by both systems.

All shortcomings of the previously-noted solution in the Background are overcome because the NMS need only make a single query to a switch regarding a cross connection on a randomly selected interface on a randomly selected switch. The tag returned by the switch with the cross connection information allows the NMS to identify the SPVC without making any other requests to switches for more information. The time and resources required to complete the operation are the same no matter what the size of the network.

The potential shortcoming of the first embodiment is overcome because switches do not report to the NMS the existence of any cross connections that are made when establishing the SPVC. The NMS merely records the static attributes of the SPVC (such as endpoints, name, traffic characteristics, etc.), plus the overall status of the SPVC as reported by a single switch at one endpoint of the SPVC (FIG. 3B). It is recognized that the second embodiment provides the desired functionality more slowly than the first embodiment, but it uses switch and NMS resources more efficiently because cross connection information is transferred from the switch to the NMS only when requested by an NMS user.

This invention is applicable to the management of communications networks containing switches which support the establishment and maintenance of soft permanent virtual connections, as illustrated by the above embodiments, but it also may be readily applied to switched virtual channel (SVC) connections. Identifiers associated with each SVC connection may be predetermined or the source node within the network may signal the NMS with a unique identifier after a SVC call has been successfully established. For example, the unique tag associated with the SVC could identify the calling party, the called party or both.

While specific embodiments of the invention have been disclosed and described it will be apparent to one skilled in the art that various further changes can be introduced. It is to be understood, however, that such changes will fall within the true scope of the invention as defined by the appended claims.

What is claimed is:

1. A system for identifying a switched virtual connection at a randomly selected intermediate core switching node in a digital communications network the communications network having multiple switching nodes for carrying multiple switched virtual connections between network endpoints, the system comprising:

a network management system for generating and attaching; to a request to establish a switched virtual connection, a connection identifying tag which uniquely identifies said switched virtual connection;

means to store said connection identifying tag and connection information at each intermediate core switching node traversed by said request to establish a switched virtual connection; and means to retrieve from a selected intermediate core switching node said connection identifying tag and connection information and to derive therefrom the particular switched virtual connection associated with the connection identifying tag.

2. A method of identifying a switched virtual connection (SVC) traversing a randomly selected intermediate core switching node within a digital communications network, said communications network having multiple switching nodes for carrying multiple switched virtual connections between network endpoints, the method comprising the steps of:

a) storing, at each switching node traversed by each SVC, connection information details respecting each SVC; and b) transferring said connection information details to a network management system upon establishment of a SVC through the communications network; and c) retrieving from said network management system said connection information details and identifying therefrom the SVC at the randomly selected switching node.

3. The method as defined in claim 2 wherein said switched virtual connection is a soft permanent virtual connection (SPVC).

4. The method as defined in claim 3 wherein said connection information is forwarded to said NMS automatically upon receipt of notification that said SPVC has been established.

5. The method as defined in claim 2 wherein said connection information is forwarded to said NMS in response to a request for said information from said NMS.

6. A system for identifying a switched virtual connection (SVC) at a randomly selected intermediate core switching node in a digital communications network, said communication network having multiple switching nodes for carrying multiple switched virtual connections between network endpoints, the system comprising:

means at each switching node crossed by each SVC for storing connection information details respecting each SVC;

means at each switching node to transfer said connection information details to a network management system upon establishment of a SVC through the network; and means for retrieving from said network management system said connection information details and identifying therefrom the SVC at the randomly selected intermediate core switching node.

7. The system as defined in claim 6 wherein said switched virtual connection is a soft permanent virtual circuit (SPVC).

8. A method of identifying a switched virtual connection (SVC) at a randomly selected intermediate core switching node in a digital communications network wherein said communications network has multiple switching nodes for carrying multiple switched virtual connections between network endpoints, the method comprising the steps of:

a) attaching, to a request to establish a switched virtual connection, a connection identifying tag which uniquely identifies said switched virtual connection;

b) storing said connection identifying tag and connection information respecting said SVC at each switching node traversed by said request to establish said switched virtual connection; and c) retrieving from a selected intermediate core switching node said connection identifier tag and said connection information to derive therefrom connection information respecting the switched virtual connection associated with the connection identifying tag.

9. The method as defined in claim 8 wherein said switched virtual connection is a soft permanent virtual circuit (SPVC).

10. The method as defined in claim 8 wherein said connection information is static attributes of the switched virtual connection including endpoint names and traffic characteristics.

11. The method as defined in claim 8 wherein the connection identifying tag identifies a calling party or a called party.

12. The method as defined in claim 8 wherein the connection identifying tag identifies a calling party and a called party.

* * * * *